United States Patent
Wang et al.

(10) Patent No.: US 11,339,761 B2
(45) Date of Patent: May 24, 2022

(54) BOLT SLEEVE CONNECTOR, BLADE AND MANUFACTURING METHOD THEREOF AND WIND TURBINE GENERATOR SYSTEM

(71) Applicant: BEIJING GOLDWIND SCIENCE & CREATION WINDPOWER EQUIPMENT CO., LTD., Beijing (CN)

(72) Inventors: Xingbo Wang, Beijing (CN); Liufeng Hao, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 924 days.

(21) Appl. No.: 15/775,910

(22) PCT Filed: Jun. 20, 2017

(86) PCT No.: PCT/CN2017/089104
§ 371 (c)(1),
(2) Date: May 14, 2018

(87) PCT Pub. No.: WO2018/120677
PCT Pub. Date: Jul. 5, 2018

(65) Prior Publication Data
US 2020/0300215 A1   Sep. 24, 2020

(30) Foreign Application Priority Data
Dec. 29, 2016 (CN) .......................... 201611243631.1

(51) Int. Cl.
*F03D 1/06* (2006.01)
*B29C 45/14* (2006.01)
(Continued)

(52) U.S. Cl.
CPC ............ *F03D 1/0675* (2013.01); *B29C 45/14* (2013.01); *B29C 45/14467* (2013.01);
(Continued)

(58) Field of Classification Search
CPC ....... F03D 1/0675; B29C 45/14; B29C 70/68; B29C 45/14467
(Continued)

(56) References Cited

U.S. PATENT DOCUMENTS 6,638,466 B1 * 10/2003 Abbott .................... B29C 33/68
264/238
10,857,743 B2 * 12/2020 Beck ...................... B29C 70/504
(Continued)

FOREIGN PATENT DOCUMENTS

| CN | 102220936 A | 10/2011 |
|---|---|---|
| CN | 103061995 A | 4/2013 |

(Continued)

OTHER PUBLICATIONS

International Search Report issued in International Application No. PCT/CN2017/089104, mailed from the State Intellectual Property Office of China dated Sep. 14, 2017.
(Continued)

*Primary Examiner* — Kenneth J Hansen
*Assistant Examiner* — David N Brandt
(74) *Attorney, Agent, or Firm* — Finnegan, Henderson, Farabow, Garrett & Dunner, LLP

(57) ABSTRACT

A bolt sleeve connector, a blade of a wind turbine generator system and manufacturing method thereof and a wind turbine generator system are provided. The bolt sleeve connector includes at least two extension portions arranged side by side and spaced apart, and each extension portion has a first end and a second end. The first ends of the extension portions are connected together and the second end of each (Continued)

extension portion is connected with the corresponding bolt sleeve. By using the bolt sleeve connectors to connect multiple pre-embedded connection sleeves at the position of the blade root of the blade of the wind turbine generator system, the multiple pre-embedded connection sleeves are connected as a whole, thus can disperse the stress of the bolt and the bolt sleeve and then improve the bearing capacity of the blade root bolt and facilitate reducing the weight of the blade root.

11 Claims, 6 Drawing Sheets

(51) Int. Cl.
*B29C 70/48* (2006.01)
*B29C 70/68* (2006.01)
*B29K 309/08* (2006.01)
*B29L 31/08* (2006.01)

(52) U.S. Cl.
CPC ............... *B29C 70/48* (2013.01); *B29C 70/68* (2013.01); *B29K 2309/08* (2013.01); *B29L 2031/085* (2013.01); *F05B 2220/30* (2013.01); *F05B 2230/20* (2013.01); *F05B 2240/221* (2013.01); *F05B 2240/30* (2013.01); *F05B 2260/301* (2013.01)

(58) Field of Classification Search
USPC ........................................................ 264/258
See application file for complete search history.

(56) References Cited

U.S. PATENT DOCUMENTS

| | | | |
|---|---|---|---|
| 2009/0324420 A1* | 12/2009 | Arocena De La Rua | B29C 70/86 416/248 |
| 2012/0070295 A1* | 3/2012 | Klein | F03D 1/0658 416/204 R |
| 2012/0207607 A1* | 8/2012 | Mironov | F03D 1/0658 416/204 R |
| 2012/0230827 A1 | 9/2012 | Dawson et al. | |
| 2012/0315143 A1 | 12/2012 | Grove-Nielsen | |
| 2014/0271210 A1 | 9/2014 | Montejo Yuste et al. | |
| 2014/0334934 A1* | 11/2014 | Kannenberg | F03D 1/0675 416/217 |
| 2015/0361950 A1* | 12/2015 | Pipo Benito | F03D 1/0691 416/221 |
| 2016/0053741 A1 | 2/2016 | Sabbadin | |
| 2017/0045032 A1* | 2/2017 | Jacobsen | F03D 1/0658 |
| 2017/0122292 A1* | 5/2017 | Michel | B23D 45/006 |

FOREIGN PATENT DOCUMENTS

| | | |
|---|---|---|
| CN | 103264510 A | 8/2013 |
| CN | 106121935 A | 11/2016 |
| CN | 205841105 U | 12/2016 |
| CN | 106762462 A | 5/2017 |
| EP | 2532880 A2 | 12/2012 |
| EP | 2944803 A1 | 11/2015 |

OTHER PUBLICATIONS

Extended European Search Report issued by European Patent Office for counterpart Application No. 17868480.9, dated May 29, 2019.

* cited by examiner

BOLT SLEEVE CONNECTOR, BLADE AND MANUFACTURING METHOD THEREOF AND WIND TURBINE GENERATOR SYSTEM

CROSS-REFERENCE TO RELATED APPLICATIONS

The present application is the national phase of International Application No. PCT/CN2017/089104, titled "BOLT SLEEVE CONNECTOR, BLADE AND MANUFACTURING METHOD THEREOF AND WIND TURBINE GENERATOR SYSTEM", filed on Jun. 20, 2017, which claims the priority to Chinese Patent Application No. 201611243631.1, titled "BOLT SLEEVE CONNECTOR, BLADE AND MANUFACTURING METHOD THEREOF AND WIND TURBINE GENERATOR SYSTEM", filed on Dec. 29, 2016, with the State Intellectual Property Office of the People's Republic of China, the content of which are incorporated herein by reference in their entirety.

FIELD

The present application relates to the technical field of wind turbine generator system, and more specifically, relates to a bolt sleeve connector used in the blade root of the blade of the wind turbine generator system, a blade of the wind turbine generator system and a manufacturing method thereof and a wind turbine generator system having the blade.

BACKGROUND

With the development of wind power industry and increasingly fierce competition in this industry, the diameter of the required overall wind turbine rotor u with the same power becomes larger and larger, the corresponding load becomes bigger and bigger, and the weight of each component becomes heavier and heavier, hence an urgent technical issue to be addressed by each enterprise is to reduce the weight of the components and the load to be borne, and to improve the bearing capacity of the components. The blade is the only component which converts the kinetic energy of the wind into the rotating mechanical energy, the load borne by most components of the whole turbine assembly is caused by the load of the blade directly or indirectly, therefore, one of the key points in designing the wind turbine generator system is to reduce the blade weight effectively, to design the blade properly and to reduce the manufacturing cost of the blade.

At present, the blade root of the blade of the wind turbine generator system is connected with the rotor hub, and there are mainly two connection manners, that is, using the T-shaped bolt and using the pre-embedded bolt sleeve.

Referring to FIG. 1 showing a glass fiber reinforced plastic blade root structure 100 connected to the impeller hub by using T-shaped bolts, inner and outer reinforcing cloths at transverse drilling holes have been removed. In order to connect the T-shaped bolt, not only an axial hole 102 should be drilled on an end surface of the blade root glass fiber reinforced plastics, but also a radial hole 101 should be drilled on the side wall. On the one hand, the T-shaped bolt bears the load by extruding the glass fiber reinforced plastics, on the other hand, the layer of the blade root glass fiber reinforced plastics may be damaged while drilling holes, therefore the thickness of the blade root glass fiber reinforced plastics is required to be relatively large, and the glass fiber reinforced plastics remained after drilling holes should not be too less. Considering the load situation of the entire blade root, the T-shaped bolt connection is seldom used on large megawatt-leveled blades, and the manner of the pre-embedded bolt sleeve connection is mostly used.

The bolt sleeve pre-embedding is to prefabricate a metal bolt sleeve inside the blade root, a glass fiber reinforced plastics layer of blade root is laid both on and below the bolt sleeve, the adjacent bolt sleeves are spaced apart by an unidirectional fiber glass fiber reinforced plastic block, and the other end away from the blade root of the bolt sleeve mostly is made of PVC material for transitively reducing weight. Compared with the load bearing of the T-shaped bolt, the load of the pre-embedded bolt sleeve is mainly shear force between the bolt sleeve and the glass fiber reinforced plastics, which will not damage the layer of the blade root glass fiber reinforced plastics. Since the bolt sleeves are relatively independent of each other, and the load is transmitted by shear force, the length of the bolt sleeve is relatively large in design.

In the blade design, not only the cost factor should be considered, but also the strength and other security requirements should also be taken into account, hence the weight reduction is relatively difficult. If a new blade root connection manner is designed to reduce the weight of the blade root in design aspect, such as to reduce the size and weight of the prefabricated metal body inside the blade root, and to design different lengths of bolts and different thicknesses of blade root layers according to the test results, the manufacture cost of the blade and the load caused by weight can be reduced at the same time, thus achieving the object of saving costs of the blade and the overall assembly.

Therefore, it is necessary to improve the conventional blade root structure of the blade of the wind turbine generator system in order to reduce the weight of the blade and ensure the design strength thereof, so as to reduce the cost of the wind turbine generator system.

SUMMARY

A bolt sleeve connector and a blade of a wind turbine generator system which contribute to reducing the blade weight of the wind turbine generator system are provided according to an aspect of the present application.

A bolt sleeve connector and a blade of a wind turbine generator system which contribute to improving the load bearing level of the blade root of the wind turbine generator system are provided according to another aspect of the present application.

A manufacturing method of the blade of the wind turbine generator system facilitating the further machining of the blade root end surface of the blade of the wind turbine generator system is provided according to another aspect of the present application.

A wind turbine generator system having the lightened blade is provided according to another aspect of the present application.

A bolt sleeve connector is provided according to an embodiment, including: at least two extension portions, the at least two extension portions are arranged side by side and spaced apart, each extension portion has a first end and a second end, wherein, the first ends of the extension portions are connected together, and the second end of each extension portion is connected with the corresponding bolt sleeve.

The first ends of each extension portion are connected together by adhesive bonding, clamping or welding.

The bolt sleeve connector is integrally molded by forging or casting.

A first coupling structure is formed on the second end of each extension portion, the first coupling structure matches with the connecting structure of the corresponding bolt sleeve to connect the corresponding bolt sleeve to the second end of the extension portion.

The first coupling structure is a boss, and the second connecting structure is a groove.

The at least two extension portions may include a first extension portion and a second extension portion respectively located at both sides of the bolt sleeve connector, a partial first coupling structure formed on the second end of the first extension portion and a partial first coupling structure formed on the second end of the second extension portion are complementarily shaped, the two partial first coupling structures are coupled with each other to form the whole first coupling structure which can match with the corresponding bolt sleeve.

The at least two extension portions may further include at least a third extension portion located between the first extension portion and the second extension portion, and the whole first coupling structure is formed on the second end of each third extension portion.

When the adjacent two bolt sleeve connectors are connected to each other, the adjacent first extension portion and second extension portion are combined to form an integral shaped third extension portion.

When multiple bolt sleeve connectors are connected, the multiple bolt sleeve connectors integrally form at least part of a predetermined ring.

A thickness of the bolt sleeve connector has a trend of gradually decreasing along the direction from the second end to the first end.

Each extension portion has an upper surface and a lower surface opposite to each other, at least one of the upper surface and the lower surface forms a roughened surface, a corrugated surface or a grooved surface.

The bolt sleeve connector integrally forms a partial ring shape, a semi-ring shape or a ring shape.

A blade of a wind turbine generator system is provided according to another embodiment. The blade root structure of the blade of the wind turbine generator system includes: the at least one bolt sleeve connector which forms at least partial ring structure; multiple bolt sleeves which are respectively arranged on the second end of each extension portion.

The length of the extension portion of the bolt sleeve connector located at a position corresponding to the blade girder of the wind turbine generator system is greater than the length of the extension portions at other positions.

The blade root structure further includes: multiple glass fiber reinforced plastic pipes, which are respectively connected to the corresponding bolt sleeves, and extend to an end of the blade root.

The blade root structure further includes: multiple glass fiber reinforced plastic blocks, which are respectively arranged between the multiple glass fiber reinforced plastic pipes, between the multiple bolt sleeves, and between the extension portions, respectively.

A manufacturing method of the blade of the wind turbine generator system is provided according to another embodiment, including following steps:

laying an outer skin of the blade in an mold cavity;

installing an blade root positioning fixture and positioning the glass fiber reinforced plastic pipes;

assembling the bolt sleeves and the bolt sleeve connectors to form a blade root pre-embedded integral structure of a partial ring shape, a semi-ring shape or a ring shape;

using positioning bolts to pass through the blade root positioning fixture and the glass fiber reinforced plastic pipes to connect with the bolt sleeves, so as to position the blade root pre-embedded integral structure by using the blade root positioning fixture;

laying other internal structural parts and an inner skin of the blade;

injecting resin between the inner skin and the outer skin and solidification molding; and removing the positioning bolts.

The method further includes arranging glass fiber reinforced plastic blocks between the glass fiber reinforced plastic pipes, between the bolt sleeves, and between the extension portions of the bolt sleeve connectors, respectively.

The method further includes winding glass fiber onto the outer surface of the bolt sleeve connector before injecting the resin.

The glass fiber reinforced plastic pipes are arranged on the side facing the blade root of the blade root positioning fixture, and the positioning bolts pass through the blade root positioning fixture and the glass fiber reinforced plastic pipes from the other side of the blade root positioning fixture to connect with the bolt sleeves.

The method further includes cutting by machining an end surface of the blade root to allow which to be smooth after the injection and demolding are finished.

The blade root positioning fixture has a flange plate structure, multiple bolt holes are formed on the flange plate along the circumferential direction, and the positioning bolts pass through the bolt holes and the glass fiber reinforced plastic pipes to connect to the bolt sleeves.

A wind turbine generator system is provided according to another embodiment, and the wind turbine generator system has the blade of the wind turbine generator system described hereinbefore.

A wind turbine generator system is provided according to another embodiment, and the wind turbine generator system has the blade of the wind turbine generator system manufactured by the method described hereinbefore.

According to the embodiments of the present application, by using the bolt sleeve connectors to connect multiple pre-embedded connection sleeves at the position of the blade root of the blade of the wind turbine generator system, the multiple pre-embedded connection sleeves are connected as a whole, so that the stress of the bolt and the bolt sleeve can be dispersed and the bearing capacity of the blade root bolt can be improved, thus facilitating the reduction of weight of the blade root.

DETAILED DESCRIPTION

Specific embodiments of the present application are disclosed in the present specification according to the requirements; however, it should be understood that the disclosed embodiments are only exemplary and can be implemented in various and alternative forms. The drawings are not required to be drawn in the actual sizes; and can be enlarged or reduced in order to display details of particular components. Therefore, the specific structure and functional details disclosed herein should not be construed as limitations to the present application, but only the representative basis for teaching the people skilled in the art to implement the present disclosure in various forms.

According to multiple embodiments of the present application, by using the bolt sleeve connector to connect multiple pre-embedded bolt sleeves at the blade root portion of the blade of the wind turbine generator system, the multiple pre-embedded bolt sleeves are connected as a whole, thus the stress of the bolt and the bolt sleeve can be dispersed and the bearing capacity of the blade root bolt can be improved.

Moreover, since the bearing capacity of the bolts and the bolt sleeves at the blade root is improved, the length of the bolts and the bolt sleeves at the blade root can be reduced, thus the weight of the blade is reduced.

Figure 1:
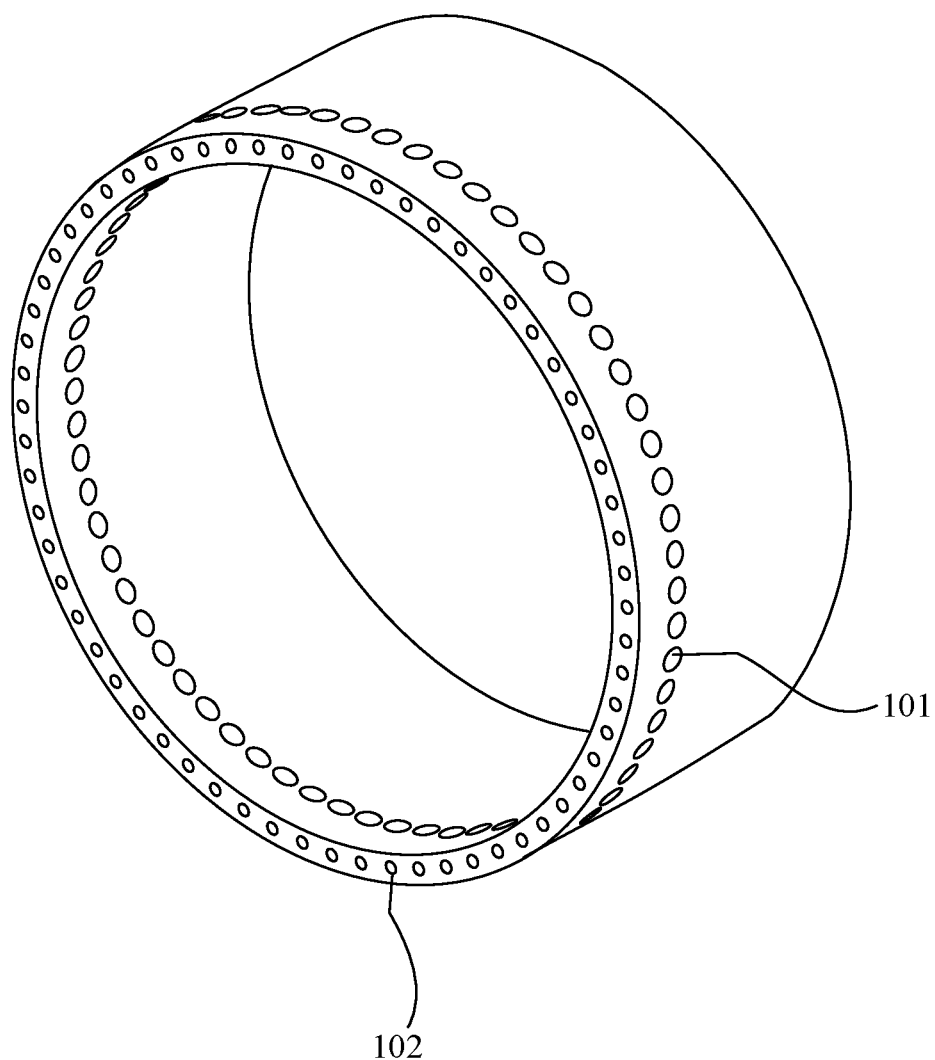
FIG. 1 is a perspective view showing a blade root structure using T-shaped bolt connection, with inner and outer reinforcing cloths at transverse drilling holes removed.
Figure 2:
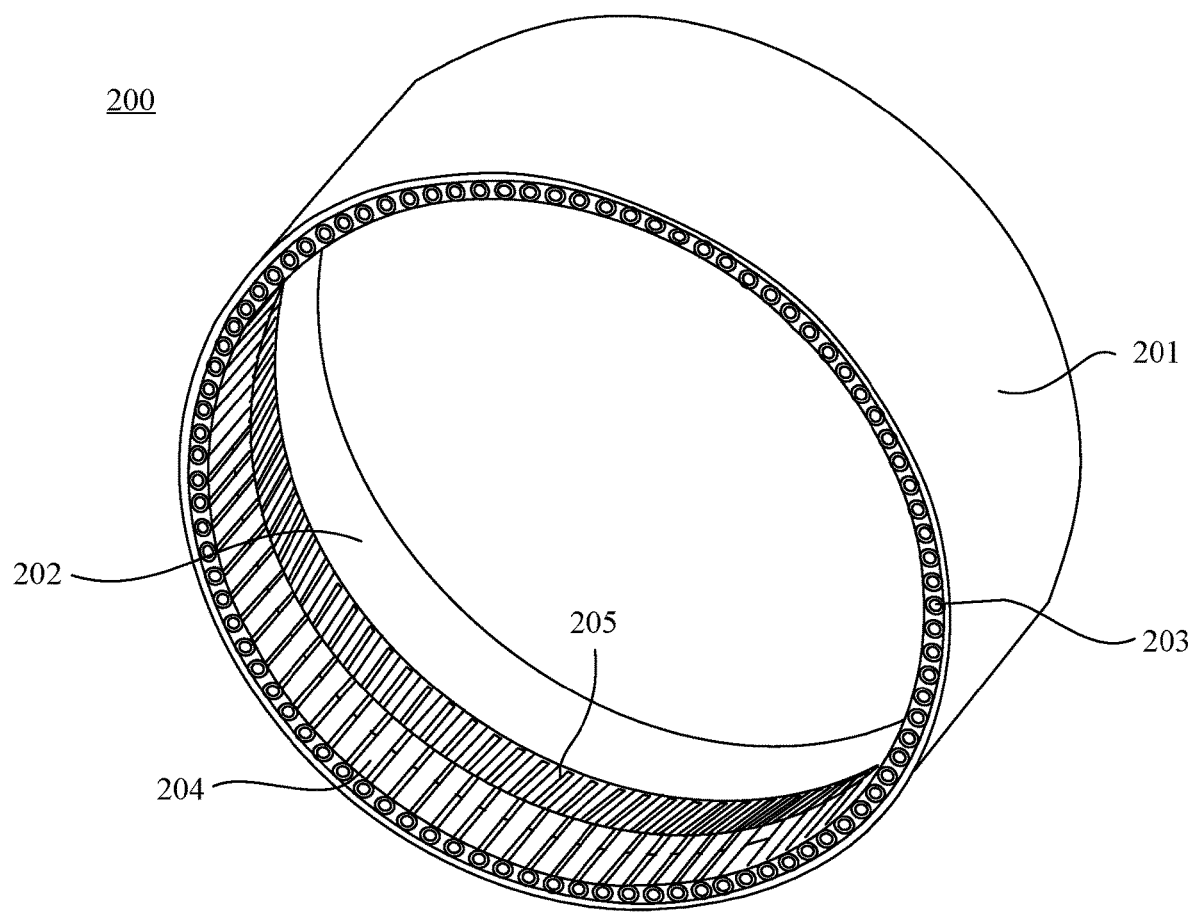
FIG. 2 is a perspective view showing a blade root structure with part of an inner skin removed.
Figure 3:
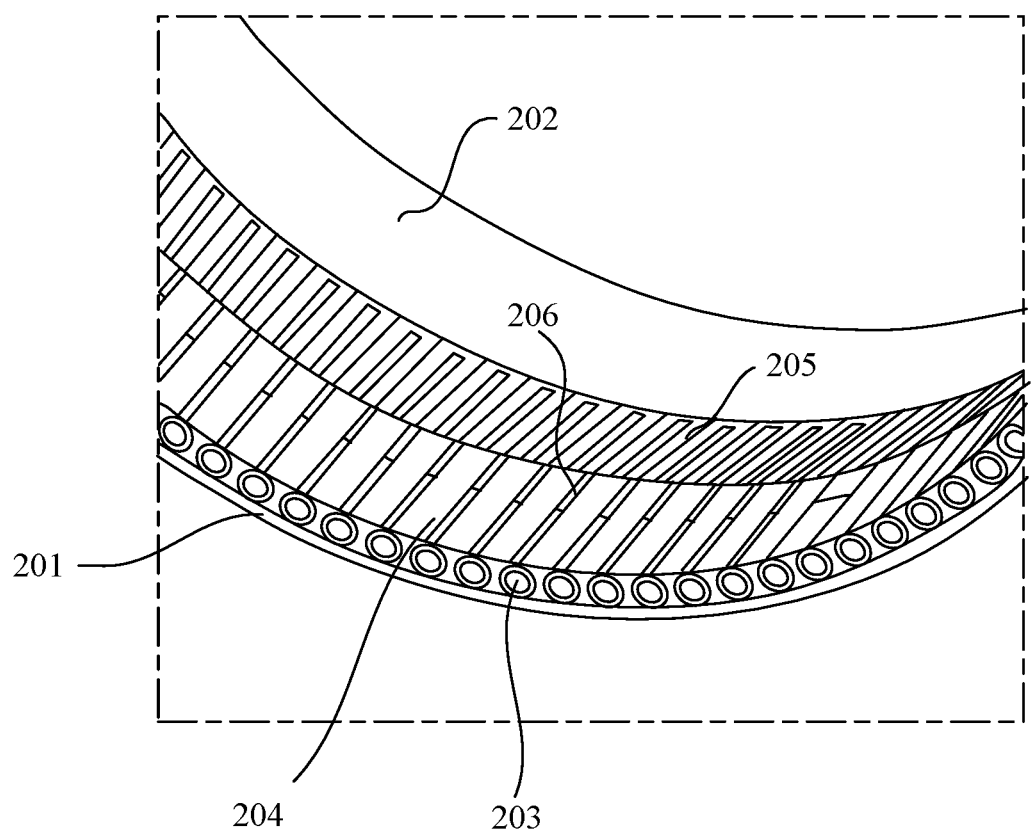
FIG. 3 is a partially enlarged view showing the blade root structure in FIG. 2.
Figure 4:
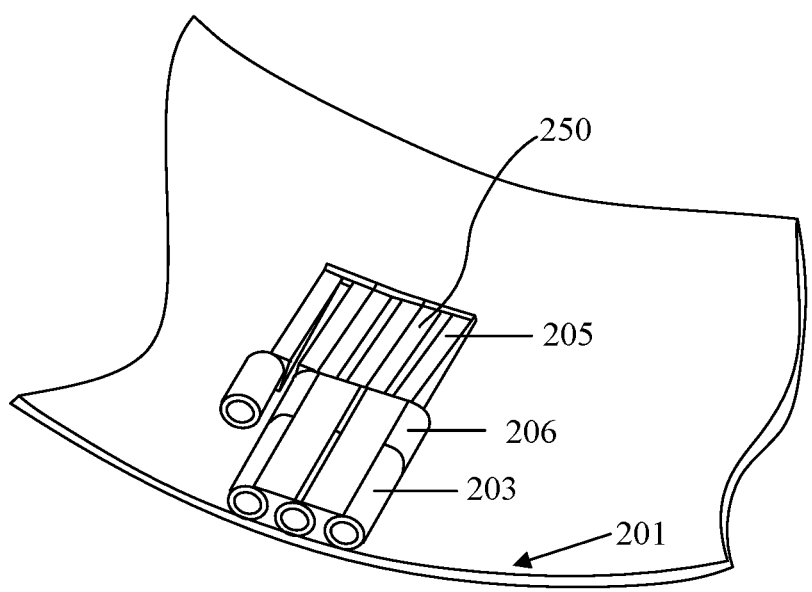
FIG. 4 is perspective view showing part of the blade root structure in FIG. 3, showing that three bolt sleeves are connected to each other, and showing a position relationship and an installation relationship between the bolt sleeve connectors and the bolt sleeves, the glass fiber reinforced plastic pipes and the glass fiber reinforced plastic blocks.
Figure 5:
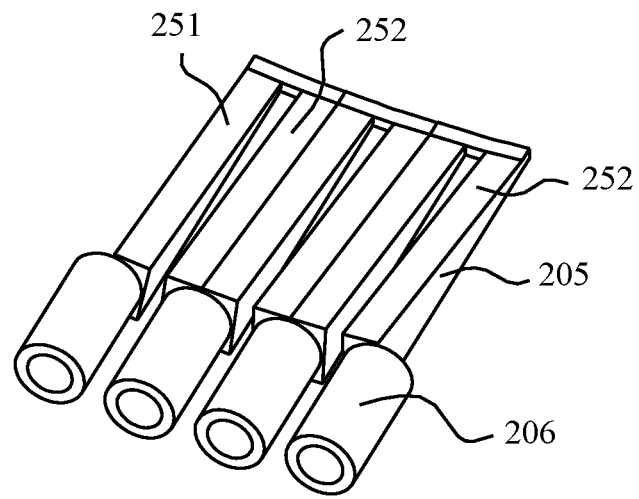
FIG. 5 is a perspective view showing an installation relationship between the bolt sleeve connectors and the bolt sleeves in FIG. 4.
Figure 6:
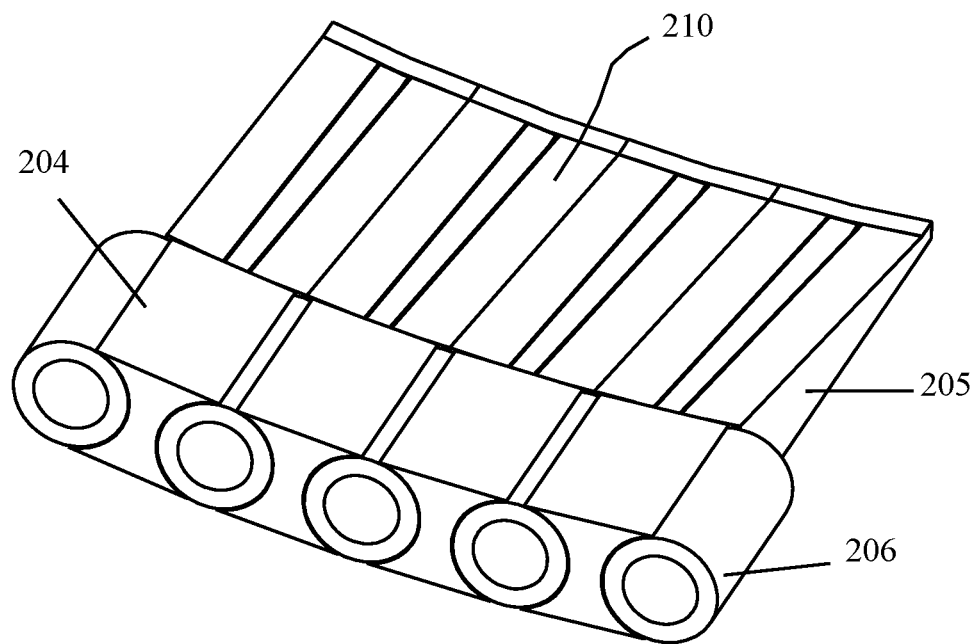
FIG. 6 is a perspective view showing an installation relationship between the bolt sleeve connectors and the glass fiber reinforced plastic blocks in FIG. 4.

FIG. 2 to FIG. 4 show a blade root structure 200 of the blade of the wind turbine generator system according to an embodiment of the present application. As shown in FIG. 2, a part of an inner skin at the blade root is removed, showing the blade root structure between an outer skin 201 and the inner skin 202.

In general, the blade root structure 200 includes the outer skin 201, the inner skin 202 and an injection molding part between the outer skin 201 and the inner skin 202. The injection molding part includes pre-embedded glass fiber reinforced plastic pipes 203, bolt sleeves 206, bolt sleeve connectors 205, and glass fiber reinforced plastic blocks 204 located between the bolt sleeves 206 and between the glass fiber reinforced plastic blocks 204 respectively. By laying glass fiber and injection-molding resin between the inner skin 202 and the outer skin 201 to make the pre-embedded glass fiber reinforced plastic pipes 203, the bolt sleeves 206, the bolt sleeve connectors 205 and the glass fiber reinforced plastic blocks 204 to form an integral structure.

The bolt sleeve connector 205 is pre-embedded inside the blade root, one end of the bolt sleeve connector faces towards the direction of the blade tip, and the other end is connected to the pre-embedded bolt sleeve 206. As shown in FIG. 3, multiple bolt sleeve connectors 205 are arranged side by side to form a ring shape consistent with the shape of the blade root, and each bolt sleeve connector 205 has two extension portions 250 (may also be called as connecting claw) extending along the longitudinal direction of the blade root. First ends of the two extension portions 250 facing toward the blade tip are connected to each other, while second ends of the two extension portions facing toward the blade root are separated from each other and connected to the bolt sleeves 206 respectively. Specifically, when the multiple bolt sleeve connectors 205 are arranged side by side, the second ends of the two adjacent extension portions 250 of the two adjacent bolt sleeve connectors 205 are connected to the corresponding bolt sleeves 206, in this way, the multiple bolt sleeve connectors 205 are connected as a whole by the bolt sleeves 206. A first end of the bolt sleeve 206 is connected to the bolt sleeve connector 205, and a second end of the bolt sleeve 206 is connected to the glass fiber reinforced plastic pipe 203. Each glass fiber reinforced plastic pipe 203 corresponds to one bolt sleeve 206 so as to allow blade root bolts (not shown) to pass through the respective glass fiber reinforced plastic pipes 203 and to be connected to the bolt sleeves 206.

The structure schematic view of the bolt sleeve 206 pre-embedded inside the blade root by using the bolt sleeve connector 205 according to the first embodiment of the present application will be described hereinafter in conjunction with FIG. 4 to FIG. 7.

Figure 7:
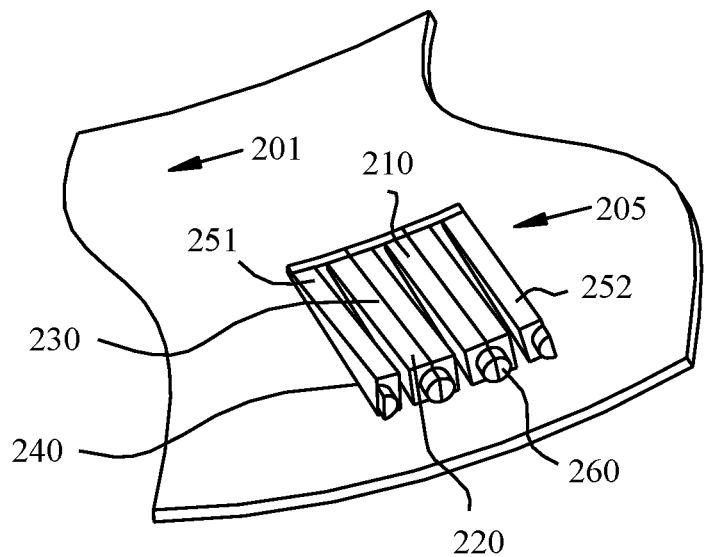
FIG. 7 is a perspective view showing bolt sleeve connectors according to the first embodiment of the present application in FIG. 4.

As shown in FIG. 7, the bolt sleeve connector 205 has two extension portions 250 separated apart from each other, and each extension portion has a first end 210 and a second end 220. The first end 210 of the extension portion 250 faces towards the direction of the blade tip, while the second end 220 of the extension portion 250 faces towards the direction of the end surface of the blade root and is connected to the first end of the bolt sleeve 206. Preferably, the bolt sleeve connector 205 can be integrally molded, such as being integrally molded by forging or casting, and may also formed by cutting off a part between the two extension portions 250 of the bolt sleeve connector 205 to form a notch to space the extension portions 250 apart whereas keeping the first ends thereof connected together. Besides, the first ends 210 of the two extension portions 250 can be connected to each other by welding, clamping or welding.

A first coupling structure 260 may be formed on the second end 220 of each extension portion 250 and matches with a connecting structure of the corresponding bolt sleeve 206 to connect the corresponding bolt sleeve 206 to the second end 220 of the extension portion 250. At least two extension portions 250 include a first extension portion 251 and a second extension portion 252 respectively located at two sides of the bolt sleeve connector 205, a partial first coupling structure formed on the second end 220 of the first extension portion 251 and a partial first coupling structure formed on the second end 220 of the second extension portion 252 are complementary in shape, and the two partial first coupling structures are jointed with each other to form the whole first coupling structure 260 which can match with the corresponding bolt sleeve 206.

Specifically, as shown in FIG. 7, in an example of the bolt sleeve connector 205 according to the first embodiment of the present application, in order to connect the bolt sleeve connectors 205 mutually, the extension portions 250 includes a first extension portion 251 and a second extension portion 252, and the adjacent first extension portion 251 and second extension portion 252 of the adjacent bolt sleeve connectors 205 together form a whole extension portion 250. The first extension portion 251 and the second extension portion 252 may respectively be one half and the other half of the whole extension portion 250. Bosses with complementary shapes, such as semicircular bosses, are provided on the second ends 220 of the first extension portion 251 and the second extension portion 252 respectively. The two semicircular bosses of the adjacent first extension portion 251 and second extension portion 252 of the two adjacent bolt sleeve connectors 205 can form a whole circular boss. Correspondingly, a circular groove (not shown) is formed on the first end connected to the bolt sleeve connector 205 of each bolt sleeve 206.

The circular groove and the circular boss can be connected by interference fit to fixedly connect the bolt sleeve 206 to the second end 220 of the corresponding extension portion 250. Preferably, external threads are formed on an outer surface of the circular boss, and internal threads are formed on an inner surface of the circular groove, so that the bolt sleeve 206 can be connected to the second end 220 of the corresponding extension portion 250 by threaded connection. More preferably, the internal threads of the circular groove may be a part of the internal threads of the bolt sleeve 206 by which the bolts sleeve is connected to the blade root bolt.

Though the connecting structure between the bolt sleeve 206 and the bolt sleeve connector 205 is described by taking the circular boss having the external thread and the circular groove having the internal thread as an example, the present application is not limited to this. For example, the circular boss may be replaced by a polygonal boss, and the circular groove is formed to be a polygonal groove corresponding to the polygonal boss, and similarly, the bolt sleeve 206 can be connected to the bolt sleeve connector 205.

As shown in FIG. 4 to FIG. 7, the area of a cross section (a section vertical with respect to the extending direction of the extension portion 250) of the extension portion 250 of the bolt sleeve connector 205 decreases gradually along the direction from the second end 220 to the first end 210, that is, the area of the cross section close to the first end of the extension portion 250 is smaller than the area of the cross section close to the second end 220 of the extension portion 250. Such a design matches with the force condition of the blade root bolt, because the blade root bolt near the end surface of the blade root is subjected to the maximum shear force, and as the blade root bolt gradually extends into the blade root, a shear force to which the blade root bolt is subjected decreases gradually, therefore the weight of the bolt sleeve connector 205 can be reduced and thus the weight of the blade is reduced.

In addition, the bolt sleeve connector 215 and the extension portion 250 thereof have an upper surface 230 and a lower surface 240 opposite to each other. The upper surface 230 is at a side facing towards the inner skin 202, and the lower surface 240 is at a side facing towards the outer skin 201. Preferably, the upper surface 230 and the lower surface 240 may have an arc corresponding to the circular shape of the blade root, thus when multiple bolt sleeve connectors 205 are connected to each other, a circle, a semicircle or a partial circle can be easily formed.

A second coupling structure and a third coupling structure which can be jointed to each other are formed on both lateral surfaces of the first end 210 of the extension portion 250 of the bolt sleeve connector 205, when the at least two bolt sleeve connectors 205 are connected to each other, the adjacent two bolt sleeve connectors 205 can be connected to each other by the second coupling structure and the third coupling structure. As for the bolt sleeve connector 205 according to the first embodiment of the present application shown in FIG. 7, the lateral surfaces facing each other of the adjacent two bolt sleeve connectors 205 may be provided with mutually corresponding or complementary coupling structures, such as a clip groove structure, so as to connect the adjacent two bolt sleeve connectors 205 to each other. In addition to the clip groove structure (or the clamping groove structure), the adjacent two bolt sleeve connectors 205 can also be connected at the first end 210 and/or the second end 220 of the adjacent extension portions 250 by adhesive bonding or welding. Thus, multiple bolt sleeve connectors 205 and the corresponding bolt sleeves 206 can be connected into an integral body, so as to disperse the load of each bolt sleeve 206 in the blade root and the corresponding the blade root bolt.

Since part of the load borne by a single blade root bolt and the corresponding bolt sleeve may be transmitted to the adjacent bolt sleeve, which makes the actual load borne by the single blade root bolt and the corresponding bolt sleeve decrease, this not only contributes to the weight reduction design of the blade of the wind turbine generator system, but also can avoid the situations that the single blade root bolt and the corresponding bolt sleeve in the blade root of the blade with separately pre-embedded bolt sleeves bear a too large load to cause that the blade root bolt is broken, the bolt sleeve is pulled out and damaged and even results in the splitting of the resin-glass fiber injection molding part around the bolt sleeve.

The bolt sleeve connector 205 may be made of metal materials, preferably, may be made of lightweight and high strength metal such as aluminum alloy, alloy steel and the like. However, the present application is not limited to this, the bolt sleeve connector 205 may also be made of nonmetal materials, such as high strength engineering plastics or glass fiber reinforced plastics and the like.

The second end of each bolt sleeve 206 is connected to the glass fiber reinforced plastic pipe 203. The glass fiber reinforced plastic pipe 203 may extend to the end surface of the blade root. The glass fiber reinforced plastic pipe 203 may be a prefabricated part, and is made through winding biaxial fabrics or triaxial fabrics, and can be molded by winding or laying fabrics and then injecting resin. The inner diameter of the glass fiber reinforced plastic pipe 203 allows a connecting bolt to pass through and allows one end of the connecting bolt to be connected seamlessly to the bolt sleeve 206. Joint structures matching in shape are formed between the glass fiber reinforced plastic pipe 203 and the bolt sleeve 206, and a sealed connection is provided at the joint so as to prevent resin from flowing inwards via the joint in the subsequent resin injection process.

In addition, a glass fiber reinforced plastic block 204 is arranged between the glass fiber reinforced plastic pipes 203 and between the bolt sleeves 206. The glass fiber reinforced plastic block 204 may mainly be made of uniaxial fabric, and may be molded in a manner similar to pultrusion and then by resin injection. In the subsequent vacuum resin injection process, since the glass fiber reinforced plastic pipe 203 has a certain thickness, an inner diameter size and the shape of the glass fiber reinforced plastic pipe 203 may not be changed. Besides, the glass fiber reinforced plastic pipe 203 and the glass fiber reinforced plastic block 204 may also be prefabricated and molded integrally. Furthermore, the glass fiber reinforced plastic block 204 may also be arranged or filled between the extension portions 250 of the bolt sleeve connectors 205, thus in the subsequent vacuum resin injection process, not only the amount of the resin consumed can be reduced, but also the strength of the blade root tends to be improved.

Figure 8:
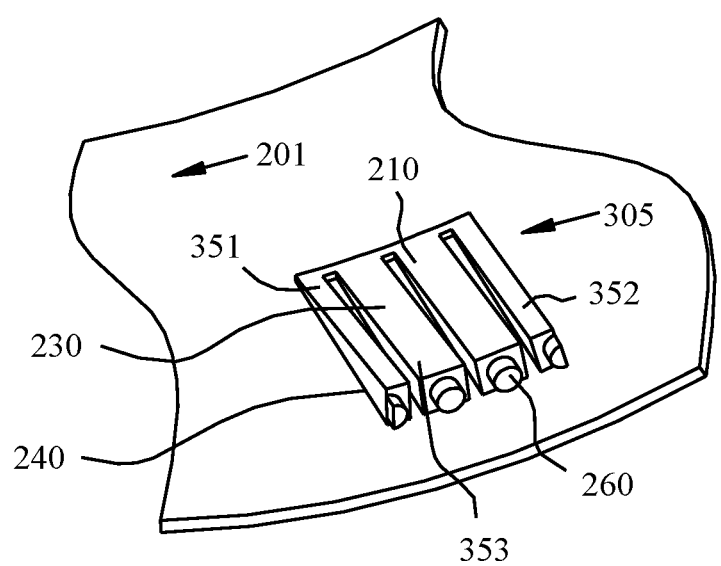
FIG. 8 is a perspective view showing bolt sleeve connectors according to a second embodiment of the present application.

FIG. 8 is a perspective view showing a bolt sleeve connector 305 according to the second embodiment of the present application. As shown in FIG. 8, a bolt sleeve connector 305 is similar to the bolt sleeve connector 205 in structure, however the bolt sleeve connector 305 includes a first extension portion 351, a second extension portion 352 and at least a third extension portion 353. The first extension portion 351 and the second extension portion 352 have the same structures as the first extension portion 251 and the second extension portion 252 of the bolt sleeve 205, which will not be described repeatedly herein. The third extension portion 353 is located between the first extension portion 351 and the second extension portion 352. As an example, in shape and structure, the first extension portion 351 and the second extension portion 352 may respectively be half of the third extension portion 353, and an integral third extension portion 353 can be formed by splicing. The third extension portion 353 may be formed by splicing the first extension portion 351 and the second extension portion 352, and may also be an integral third extension portion 353 directly by machining, in other words, the third extension portion 353 is an integral extension portion, which can be separated into two parts, the two parts may respectively correspond to the first extension portion 351 and the second extension portion 352 in shape and structure.

Figure 9:
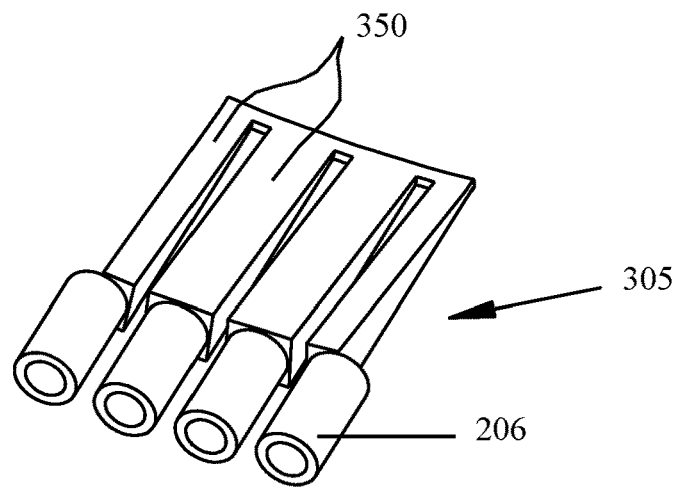
FIG. 9 is a perspective view showing an installation relationship between the bolt sleeve connectors and the bolt sleeves according to the second embodiment of the present application shown in FIG. 8.

FIG. 8 shows that the bolt sleeve connector 305 includes a first extension portion 351, a second extension portion 352 and two integral third extension portions 353. The first ends of the first extension portion 351, the second extension portion 352 and the third extension portions 353 are connected to each other, while the second ends are respectively connected to the corresponding bolt sleeves 206. Since the two third extension portions 353 in the middle are integral extension portions, the second ends of the two third extension portions 353 in the middle have integral connecting bosses, thereby the two third extension portions 353 are directly connected to two bolt sleeves 206 respectively. Comparatively, speaking, the first extension portion 351 and the second extension portion 352 located at the outer sides are respectively half extension portion and thus are required to be respectively, jointed to the second extension portion 352 and the first extension portion 351 of the adjacent bolt sleeve connectors 305 to form an integral extension portion, and be connected to the same bolt sleeve 206, as shown in FIG. 9.

Similar to the bolt sleeve connector 205 in the first embodiment of the present application, multiple bolt sleeve connectors 305 can similarly be connected together to form at least a part of the predetermined circle as a whole.

Figure 10:
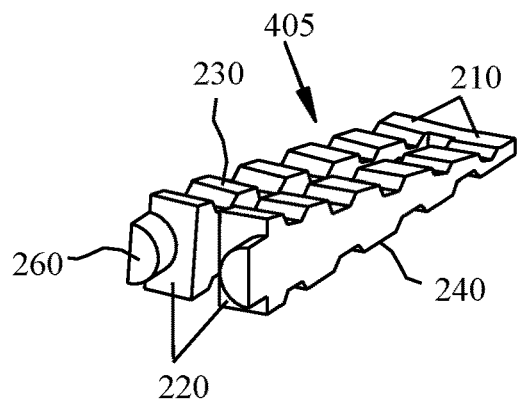
FIG. 10 is a perspective view showing a bolt sleeve connector according to a third embodiment of the present application.
Figure 11:
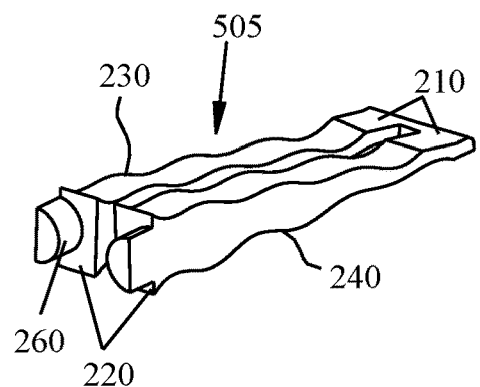
FIG. 11 is a perspective view showing a bolt sleeve connector according to a fourth embodiment of the present application.

FIG. 10 and FIG. 11 respectively show bolt sleeve connectors 405 and 505 according to the third and fourth embodiments of the present application.

The difference between the bolt sleeve connectors 405 and 505 and the bolt sleeve connector 205 only lies in the shape of the outer surface of the extension portion. Therefore, for the sake of clarity and simplicity, the description of the same characteristics of the bolt sleeve connectors 405 and 505 as the bolt sleeve connection 205 is omitted.

As shown in FIG. 10, trapezoidal grooves are formed on the upper surface 230 and the lower surface 240 of the bolt sleeve connector 405. Of course, grooves of various other shapes such as swallow-tailed grooves, rectangular grooves, semicircular grooves, triangle grooves and the like can be adopted to replace the trapezoidal grooves.

As shown in FIG. 11, corrugations are formed on the upper surface 230 and the lower surface 240 of the bolt sleeve connector 505.

In addition, grooves or corrugations may also be formed only at one surface (such as the upper surface or the lower surface), or roughened surface is formed on the upper surface or the lower surface.

Due to the roughened surface, the corrugated surface or the grooved surface are formed on the upper surface 230 and/or the lower surface 240 of the extension portion 250 of the bolt sleeve connector, a frictional force of the upper surface 230 and/or the lower surface 240 increases, and in the subsequent process, by laying glass fiber on the upper surface 230 and/or the lower surface 240 and then injecting resin, the resin-glass fiber injection molding part and the bolt sleeve connector can be jointed together more tightly and may not be separated easily. Preferably, an extending direction of the grooves or the corrugations is perpendicular to the extending direction of the extension portion 250.

The above embodiments all show that the two extension portions at the outermost sides of the bolt sleeve connector are half extension portions, however, the called half extension portion is defined relative to whether it can be connected to one bolt sleeve 206 or not, therefore, in the present application, the structure of the extension portion is not limited to this. In case that the second ends of the adjacent extension portions of the adjacent two bolt sleeve connectors can be mutually connected by the bolt sleeve 206, the extension portion at the outermost side may be a whole extension portion.

Several kinds of examples of the bolt sleeve connectors are described in the above embodiments, but the present application is not limited to this. The characteristics of the bolt sleeve described above can be mutually jointed to form a new bolt sleeve connector, which can be expected by those skilled in this field.

In addition, the number of the extension portions of the bolt sleeve connector is not limited to two or four, but may be three or more. In the above embodiments, the bolt sleeve connectors are formed separately and are spliced to form an arc-shape, a semicircle shape or a circle shape. However, the bolt sleeve connectors can directly form a semicircle shape or a circle shape, rather than being formed separately, and forming a partial circle is also feasible. The semicircle shaped bolt sleeve connectors can be applied to the process by which the blade is manufactured in two parts, while the circle shaped bolt sleeve connectors can be applied to the process by which the blade is manufactured integrally.

Furthermore, in the actual utilization, even in the blade root structure, adopting the way of combining the independent bolt sleeves with the bolt sleeves having the bolt sleeve connectors to embed the bolt sleeves can still obtain good technical effects compared with the way of only embedding independent bolt sleeves or T-shaped bolts.

The manufacturing method for manufacturing the blade of the wind turbine generator system according to the present application will be described hereinafter.

First, laying a lower half skin 201 of the blade in a pre-manufactured mold cavity;

Next, installing a blade root positioning fixture at the blade root of the blade;

Then, placing the glass fiber reinforced plastic pipes 203 on the inner side of the outer skin 201, the multiple glass fiber reinforced plastic pipes 203 are arranged on the side facing towards the blade root relative to the blade root positioning fixture, and moreover, the clearance between the glass fiber reinforced plastic pipes can be filled with the glass fiber reinforced plastic blocks 204;

Then, assembling the bolt sleeve 206 and the bolt sleeve connector 205 to form a semi-ring shaped or ring shaped pre-embedded metal structure;

Then, connecting in a seal manner the glass fiber reinforced plastic pipes 203 with the semi-ring shaped or ring shaped pre-embedded metal structure assembled, so that each glass fiber reinforced plastic pipe 203 is relatively connected to each bolt sleeve 206 seamlessly, and in order to avoid clearance between the bolt sleeve 206 and the glass fiber reinforced plastic pipe 203 and prevent the glass fiber reinforced plastic pipe 203 from moving, the bolt sleeve 206 and the glass fiber reinforced plastic pipe 203 may be seal-connected by using a sealant;

Then, using the positioning bolt to enter from the other side via the bolt hole in the blade root positioning fixture, and to pass through the glass fiber reinforced plastic pipe 203 to connect to the bolt sleeve 206 by threaded connection, so as to finish the positioning of all the pre-embedded parts;

In a case that the upper surface 230 or the lower surface 240 of the extension portions of the bolt sleeve connector has a roughened surface, corrugated surface or grooved surface, further winding glass fiber on the upper surface and the lower surface and smoothing the glass fiber;

Then, laying various other structural parts in the blade, such as a girder, a core material and the like;

Then, laying the inner skin 202;

Then, injecting resin under vacuum;

Finally, removing the installation positioning bolts.

If the blade is made up of two parts, the two parts of the blade are required to be compound-molded and demolded to form an integral part.

In addition, when laying the pre-embedded parts, not only the glass fiber reinforced plastic blocks 204 can be filled between the glass fiber reinforced plastic pipes 203, but also the glass fiber reinforced plastic blocks can be arranged or filled between the bolt sleeves 206 and between the extension portions 250, so that after the resin injection and solidification, the glass fiber reinforced plastic blocks, the bolt sleeves, the bolt sleeve connectors and the glass fiber reinforced plastic pipes can form an integral part, which contributes to improving the strength of the blade root.

Since the blade root of the blade molded according to the above method only has glass fiber reinforced plastics, the machining is convenient to be carried out to smooth the end surface of the blade root.

The shape of the blade root positioning fixture corresponds to the shape of the blade root, therefore, the blade root positioning fixture may have a flange structure, on which multiple bolt holes are formed for the positioning bolts to pass through, and the position of each bolt hole corresponds to the pre-embedded position of the bolt sleeve 206.

Since among the blade root bolts, the blade root bolt corresponding to the girder is subjected to the largest stress, the length of the extension portion of the bolt sleeve connector located at the corresponding position of the girder of the blade of the wind turbine generator system is greater than the length of the extension portions at other positions.

In the structure of the blade root of the blade according to the embodiments of the present application, the bolt sleeve connectors can integrally form a ring shape or a semi-ring shape, and can also be formed separately and then be mutually connected to form a ring shape or a semi-ring shape, and be pre-embedded integrally with the bolt sleeve 206 and the glass fiber reinforced plastic pipes 203 and the glass fiber reinforced plastic blocks 204 inside the blade root, then be formed into a whole body by resin injection molding. Since part of the force borne by each blade root bolt is dispersed by the adjacent bolts, a shorter bolt sleeve can be adopted, which contributes to the weight reduction of the blade root.

For instance, in the conventional blade root structure with pre-embedded bolt sleeves, a length of the bolt sleeve is normally more than 360 mm, and a length of the bolt extending from the end surface of the blade root to the inside of the blade approximates to 360 mm. And in the manner of the T-shaped bolt connection, a distance from a round nut to the blade root plane is normally above 180 mm, and a length of the bolt extending from the end surface of the blade root to the inside of the blade approximates to 180 mm. While in the present solution, a length of the bolt sleeve can be designed to be or more than 100 mm, and the inner cavity is all internally threaded; and a length of the bolt sleeve connector can be designed to be or more than 300 mm, one end of which (that is, the second end of the extension portion) has an external thread (that is, the external thread on the circular boss) of the same size as the bolt sleeve, with the length of the external thread being more than 20 mm, and the other ends (that is, the first ends of the extension portions) are connected together. For facilitating the subsequent cutting of the blade root end surface, the minimum length of the glass fiber reinforced plastic pipe is designed to be 10 mm and the length can be increased according to different designs.

Similarly, combining the pre-embedded bolt sleeve with the T-shaped bolt in the conventional technology can also reduce the length of the bolt effectively.

In the present application, the bolt sleeve connector is used in the blade root of the blade of the wind turbine generator system, however, the present application is not limited to this, the bolt sleeve connector can be used in cantilever structures similar to the blade of the wind turbine generator system in other fields.

The bolt sleeve connectors used to connect the pre-embedded bolt sleeves in the blade root of the blade of the wind turbine generator system, the corresponding blade structure and the manufacturing method thereof are described according to the embodiments of the present application. Obviously, the wind turbine generator system blade using the above bolt sleeve connectors and the wind turbine generator system having the blade manufactured by the described method are also within the scope of the present application.

It is clear according to the above description that, at least the following technical effects can be obtained by using the pre-embedded bolt sleeve connector in the blade root of the blade of the wind turbine generator system:

1. The force borne by the bolts at the dangerous positions is reduced, and the security of the blade root bolts is improved;

2. When considering the force situation, half of or all the blade root bolts are considered as a whole, therefore the thickness of the layer and the length of the blade root bolts can be reduced effectively, thus the weight of the blade is reduced;

3. The weight of a portion with a length more than about 100 mm at the blade root is reduced compared with the conventional design, thus reducing the load of the blade and the system, especially the fatigue load;

4. Without changing a pitch diameter of the blade root, the number of the bolts can be directly increased according to the requirements of the entire wind turbine generator system due to the specificity of the design, so that the bearing capacity of the blade root bolts is improved;

5. Since the glass fiber reinforced plastics is the only material at the blade root, in the case that the end surface of the blade root is not flush when closing the mold, the blade root end surface can be cut to ensure the smoothness of the end surface of the blade root.

6. The design freedom of the blade root is improved, for example, the length of the pre-embedded metal body and the position of the bolt sleeve can be changed according to the checked safety factor. When the checked safety factor is higher, the length of the connecting metal body can be reduced (the weight is reduced), and the pre-embedded body can be moved towards the blade root (due to the movement, the glass fiber reinforced plastic pipes is shortened, the glass fiber reinforced plastic block is shortened, and the weight is reduced), so as to reduce the length of the connecting bolt (the weight is reduced), and to reduce the weight; when the fatigue safety factor is lower, by increasing the length of the glass fiber reinforced plastic pipe, the safety factor can be improved without increasing the number of the blade root bolts.

Although the exemplary embodiments are described hereinbefore, it does not mean that these embodiments describe all possible forms of the present application. More precisely, the words used in the specifications are descriptive words rather than restrictive words, and it should be understood that, various changes can be made without departing from the spirit and scope of the disclosure. In addition, further embodiments of the present application can be made by combining the characteristics of various implemented embodiments.

What is claimed is:

1. A blade root structure, comprising: a plurality of bolt sleeve connectors configured to connect to a plurality of bolt sleeves respectively, the plurality of bolt sleeve connectors comprising a first bolt sleeve connector adjacent to a second bolt sleeve connector, the first and second bolt sleeve connectors each comprising: a plurality of extension portions arranged side by side and spaced apart, each of the plurality of extension portions having a first end and a second end, the plurality of extension portions include a first extension portion and a second extension portion, the first extension portion being located at a first side of the bolt sleeve connector and the second extension portion being located at a second side of the bolt sleeve connector, and a first partial coupling structure formed on the second end of the first extension portion of the first bolt sleeve connector and a second partial coupling structure formed on the second end of the second extension portion of the second bolt sleeve connector are configured to be coupled with each other to form a first whole coupling structure configured to engage with a bolt sleeve of the plurality of bolt sleeves.

2. The blade root structure according to claim 1, wherein the first ends of the plurality of extension portions are connected together by adhesive bonding, clamping or welding, or by being integrally formed together.

3. The blade root structure according to claim 1, wherein the plurality of extension portions further include a third extension portion located between the first extension portion and the second extension portion, and a second whole coupling structure is formed on the second end of the third extension portion.

4. The blade root structure according to claim 1, wherein when the plurality of the bolt sleeve connectors are connected, the plurality of bolt sleeve connectors integrally form at least a part of a predetermined ring shape.

5. The blade root structure according to claim 1, wherein a thickness of at least one of the plurality of bolt sleeve connectors gradually decreases along a direction from the second end to the first end.

6. The blade root structure according to claim 1, wherein each extension portion of the plurality of extension portions has an upper surface and a lower surface opposite to each other, and at least one of the upper surface and the lower surface forms a roughened surface, a corrugated surface, or a surface with grooves.

7. The blade root structure
according to claim 1, wherein the plurality of bolt sleeve connectors are configured to form at least a partial ring structure.

8. The blade root structure according to claim 7, further comprising:
a plurality of glass fiber reinforced plastic pipes, respectively connected to corresponding bolt sleeves of the plurality of bolt sleeves and configured to extend to an end of the blade root structure.

9. The blade root structure according to claim 8, further comprising:
a plurality of glass fiber reinforced plastic blocks, arranged between the plurality of glass fiber reinforced plastic pipes, between the plurality of bolt sleeves, and between the plurality of extension portions, respectively.

10. A blade of a wind turbine generator system comprising the blade root structure according to claim 1.

11. A wind turbine generator system comprising a blade, the blade comprising the blade root structure according to claim 1.

* * * * *